March 12, 1968     L. H. BARNETT     3,372,820
HEATING ARRANGEMENT FOR MOLDING MACHINES
Filed Oct. 22, 1965
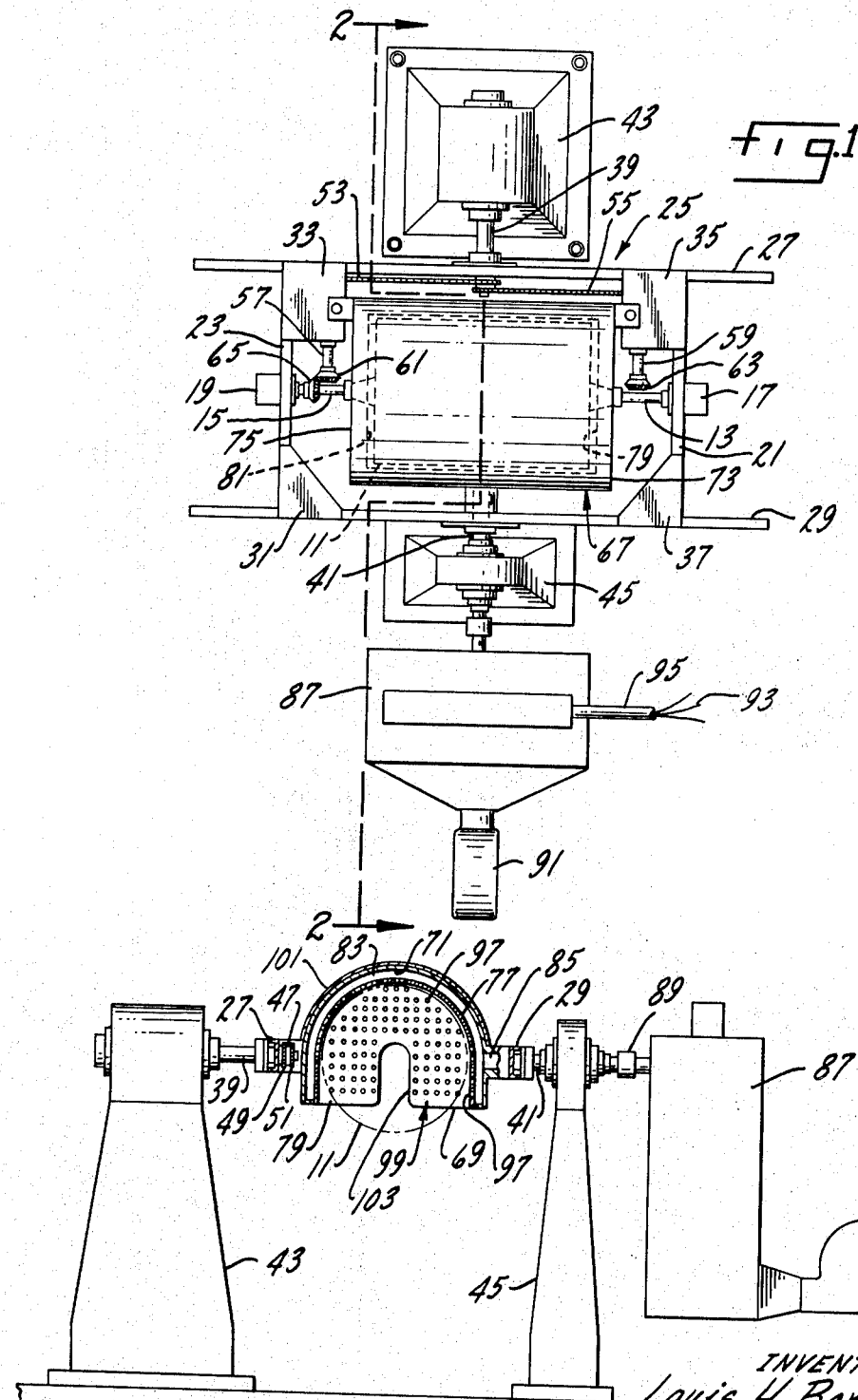
INVENTOR.
Louis H. Barnett,
BY Parker & Carter
Attorneys.

3,372,820
HEATING ARRANGEMENT FOR
MOLDING MACHINES
Louis H. Barnett, Fort Worth, Tex., assignor, by mesne assignments, to Loma Industries, Inc., Cleveland, Ohio, a corporation of Ohio
Filed Oct. 22, 1965, Ser. No. 501,915
10 Claims. (Cl. 264—310)

This invention relates to an apparatus and a method for heating a rotating mold and more particularly to an apparatus and a method for utilizing a remotely heated fluid to heat a rotating mold.

An object of this invention is to utilize a remotely heated fluid to heat a mold during simultaneous rotation of said mold about mutually perpendicular axes.

Another object is to enclose at least part of a mold which is rotated about mutually perpendicular axes and to use said enclosure to direct a heat transfer medium against said mold during rotation thereof.

Another object is to direct remotely heated fluid against all portions of a mold during rotation thereof about one or more axes.

Other objects will be found in the following specification, claims and drawings in which:

FIGURE 1 is a top plan view of an apparatus of the type described; and

FIGURE 2 is a view taken substantially along line 2—2 of FIGURE 1.

The apparatus shown in FIGURES 1 and 2 may be utilized to rotate a mold 11 about mutually perpendicular axes and is particularly adapted to the rotation of molds used in the thermofusion molding of plastics. The mold, which in this example is cylindrical, may be supported for rotation about its longitudinal axis by spindles 13 and 15 engaging the opposite ends thereof. The spindles may be journalled in bearings 17 and 19 mounted respectively on cross members 21 and 23 of a frame 25. The frame may also include side members 27 and 29 connected to the cross members 21 and 23 to form a rectangular shaped structure. Reinforcing plates 31, 33, 35 and 37 are fastened to adjacent side and cross members at the corners of the frame to provide strength and rigidity.

The frame 25 is fastened to shafts 39 and 41 which are rotatably supported on upright stanchions 43 and 45 so as to permit rotation of the frame 25 about a horizontal axis extending through said shafts. The stanchion 43 contains a mechanism to rotate the shaft 39 and the frame 25. This mechanism is not shown but may be of any conventional nature such as gearing driven by an electric motor, etc. The shaft 39 is tubular and a coaxially aligned shaft 47 extends therethrough from the stanchion 43 to a position inside of the frame 25. Sprocket wheels 49 and 51 may be mounted on the shaft 47 inside of the frame to engage drive chains 53 and 55 which may be connected to drive shafts 57 and 59 supported on the frame. Mounted on the ends of these drive shafts are bevel gears 61 and 63, one of which will engage a bevel gear 65 mounted on shaft 13 or 15 to rotate the mold 11 about its longitudinal axis. With this arrangement, the driving mechanism that rotates the frame 25 around a horizontal axis can also be utilized to rotate the mold 11 about its longitudinal axis.

A housing 67 is mounted on the frame 25 to partially enclose the mold 11 and to rotate with said mold and frame about the horizontal axis defined by the shafts 39 and 41. The housing is in the shape of a quonset hut having an open base 69 and is constructed as a double walled structure having an outer semi-cylindrical wall 71, outer end walls 73 and 75, an inner semi-cylindrical wall 77 and inner end walls 79 and 81 with the inner and outer walls spaced from one another. The spaced outer and inner walls define a plenum or distribution space 83 which is connected to a passage 85 extending through the shaft 41. The passage in the shaft 41 extends through the stanchion 45 to connect to a heater 87 located adjacent to and outwardly of the stanchion through means of a tubular collar 89 which is connected to the heater and telescopes over shaft 41. A blower 91 drawing atmospheric air is connected to the heater 87 to provide a supply of air for use as a heat transfer fluid. Other heat transfer fluids such as compressed air, water, etc. may also be used but atmospheric air is preferred for economy of operation. The heater 87 may be of any conventional type and in this example is shown as electric, having current supplied by wires 93 located in conduit 95.

Apertures 97 are formed in the inner walls 77, 79 and 81 of the housing to provide communication between the plenum 83 and a mold cavity or enclosure 99 defined by the inner walls of the housing. The apertures are patterned in the inner walls to direct a flow of heated air against all portions of the mold 11 located in the cavity. During rotation of the mold about its longitudinal axis the entire mold will be heated by air directed through the apertures, against the mold and out of the housing cavity through the open base 69 of the housing.

The upper portion of the outer wall 71 of the housing may be covered by insulation 101 to reduce heat loss. The inner and outer end walls 73, 75, 79 and 81 of the housing may be cut away, as wall 79 is shown cut away at 103, to accommodate shafts or spindles 13 and 15 and allow a substantial portion of the mold 11 to be positioned in the mold cavity 99. Cutting away the end walls of the housing in the manner shown also permits the mold 11 to be easily inserted into and removed from the mold cavity.

Whereas the housing has been shown as semi-cylindrical in shape and having an open base, it should be understood that the housing may be consructed in other convenient shapes and may be formed so that it completely encapsulates the mold. To permit removal of insertion of the mold in such a housing, the housing can be constructed in two or more sections which are detachably fastenable to each other. In such a housing, exhaust means are provided to permit the heated air to escape from the mold cavity and the exhaust means could be formed in the end walls of the housing around the spindles 13 and 15.

Further, it should be understood that although the source of heat for the air is shown as electricity, other methods of heating the air such as blowing it over coils, heater elements, hot water, etc. could be utilized. The source of fuel for such a heater could be gas, oil, etc.

The use, operation and function of the invention are as follows:

The method and apparatus of the invention are intended primarily for use in molding plastic articles in a mold which is rotated about one or more axes and heated during rotation so that a charge of plastic material in the mold is melted and caused to flow by centrifugal force to the outer walls of the mold and, thus, form a thin walled hollow object in the shape of the mold. The apparatus shown in the drawings is designed to rotate a mold 11 about mutually perpendicular axes and to direct a remotely heated fluid such as air at high temperature against the surfaces of the mold during rotation thereof.

The cylindrically shaped mold 11 is held by spindles 13 and 15 for rotation about its longitudinal axis. The spindles are mounted on frame 25 and the spindles and the mold are rotated with this frame about an axis passing through shafts 39 and 41 which support the frame and are horizontally mounted on stanchions 43 and 45. Also, mounted on the frame 25 is a housing 67 which encloses a substantial part of the mold and rotates with the mold about the horizontal axis defined by shafts 39 and 41. The housing also functions to conduct and direct the remotely heated air against mold 11 during rotation thereof. This is accomplished by means of a plenum 83 formed in the housing between the inner and outer walls thereof and connected by means of a passage 85 in the tubular shaft 41 to a heater 87. The blower 91 takes air from the atmosphere, forces it through the heater 87, then through the passage 85 and into the plenum 83 of the housing. From the plenum the heated air passes through the apertures 97 in the inner walls of the housing and is directed against the mold 11. After passing over the surfaces of the mold, the heated air exhausts through the open base 69 of the housing. Since the mold 11 is rotated about its longitudinal axis relative to the housing, all surfaces of the mold will be affected by the heated air passing through the apertures 97 even though the housing does not completely surround the mold. The use of a housing having an open base also facilitates the insertion of the mold into and its removal from the cavity of the housing. Ease of insertion and removal of the mold from the cavity is further facilitated by cutting away portions of the end walls of the housing as at 103 to provide clearance to accommodate the spindles 13 and 15.

I claim:

1. A mold heating apparatus for use in a thermofusion rotational molding machine in which a mold is supported by a frame for rotation about a first axis and the frame and mold are mounted for rotation about an axis perpendiculr to said first axis including:
   means for heating a heat transfer fluid with said means located remotely from said mold,
   a housing attached to said frame and defining an enclosure to receive at least part of said mold,
   said housing having outer and inner walls defining a plenum,
   a plurality of openings extending through said inner walls from said plenum and into said mold enclosure,
   at least one opening exhausting from said mold enclosure,
   a conduit connected to said plenum to conduct said heat transfer fluid from said heating means into said plenum,
   said conduit being formed and adapted to maintain communication between said heating means and said plenum during rotation of said housing with said frame and mold, and
   means to move said heat transfer fluid from said heating means through said conduit, plenum and inner wall openings, against said mold and out said mold enclosure exhaust opening.

2. A mold heating apparatus for use in a thermofusion rotational molding machine in which a mold is supported by a frame for rotation about a first axis and the frame and mold are mounted for rotation about an axis perpendicular to said first axis including:
   means for heating a heat transfer fluid with said means located remotely from said mold,
   a housing attached to said frame and defining an enclosure to receive a substantial part of said mold,
   said housing having outer and inner walls defining a plenum,
   a plurality of openings extending through said inner walls connecting said plenum and said mold enclosure,
   at least one opening exhausting from said mold enclosure,
   a conduit leading to said plenum to conduct said heat transfer fluid from said heating means into said plenum,
   said conduit extending coaxially with the axis of rotation of frame to rotate with the frame and housing, and
   means to move said heat transfer fluid from said heating means through said conduit, plenum and inner wall openings, against said mold and out said mold enclosure exhaust opening.

3. A mold heating apparatus for use in a thermofusion rotational molding machine in which a mold is rotated about at least one axis including:
   means for heating a heat transfer fluid at a location remote from said mold,
   means for rotating said mold about a predetermined axis,
   a housing formed and adapted to enclose at least part of said mold during rotation about said axis,
   said housing having outer walls and inner walls enclosing a heat transfer fluid distribution space,
   a plurality of openings extending through said inner walls from said distribution space into said mold enclosure,
   at least one exhaust outlet leading from said enclosure,
   a conduit leading into said distribution space from said transfer fluid heating means, and
   means to move said transfer fluid from said heating means through said conduit, distribution space, mold enclosure and exhaust outlet to heat said mold.

4. A mold heating apparatus for use in a thermofusion rotational molding machine in which a mold is rotated about at least one axis including:
   means for heating a heat transfer fluid at a location remote from said mold,
   means for rotating said mold about a predetermined axis,
   a housing formed and adapted to enclose at least part of said mold during rotation about said axis,
   said housing having outer walls and inner walls enclosing a heat transfer fluid distribution space,
   a plurality of openings extending through said inner walls from said distribution space into said mold enclosure,
   said openings being arranged to direct said heat transfer fluid against all portions of said mold during rotation of said mold about said axis,
   at least one exhaust outlet leading from said enclosure,
   a conduit leading into said distribution space from said transfer fluid heating means,
   means to move said transfer fluid from said heating means through said conduit, distribution space, inner wall openings, mold enclosure and exhaust outlet to heat said mold.

5. A method for heating a mold that is rotated about mutually perpendicular axes comprising the steps of:
   enclosing at least part of said mold,
   rotating said enclosure with said mold around one of said axes,
   increasing the temperature of a heat transfer fluid at a location remote from said mold, and
   conducting said heated transfer fluid to said enclosure and directing it against said mold.

6. A method for heating a mold that is rotated about mutually perpendicular axes comprising the steps of:
   enclosing a substantial part of said mold,
   rotating said enclosure and said mold around one of said axes,
   increasing the temperature of a heat transfer fluid at a location remote from said mold, and
   conducting said heated transfer fluid to said enclosure to heat said mold.

7. A mold heating apparatus for use in a thermofusion rotational molding machine in which a mold is supported by a frame for rotation about a first axis and the frame and mold are supported for rotation about an axis perpendicular to said first axis including:
   an air heater located remotely from said mold,
   a tubular shaft supporting said frame for rotation about said axis perpendicular to said first axis,
   a semi-cylindrical open-sided container attached to said frame and defining an enclosure to receive at least a part of said mold, said container having outer and inner walls defining an air distribution space, a plurality of openings extending through said inner walls from said air distribution space and into said enclosure, said tubular shaft connecting said heat distribution space with said heater, and means to move air through said air heater, tubular shaft, air distribution space, inner wall openings and into said enclosure, against said mold and out of said enclosure through the open side of said container.

8. Apparatus for manufacturing molded articles from a thermoplastic synthetic resin comprising in combination:
(a) a rotatably mounted frame,
(b) a mold mounted for rotation in said frame, the axis of rotation of said mold being substantially perpendicular to the axis of rotation of said frame,
(c) an annular jacket or housing, with a foraminous inner wall embracing said mold, fixedly disposed in relation to said frame, said jacket being connected in fluid-conducting relation to a source of fluid at a temperature higher than the melting point of said resin,
(d) means for rotating said frame,
(e) means for rotating said mold disposed upon said frame, and
(f) a hollow shaft journalled into said frame, said hollow shaft also serving as a means for conducting fluid.

9. The apparatus of claim 8 wherein said annular jacket encloses substantially the entire mold leaving a narrow open portion around said mold, and said fluid, after having contacted the exterior surface of said mold, emanates from said open portion.

10. The apparatus of claim 9 wherein said fluid is air at an inlet temperature in the range of about 500–1000° F. and an exit temperature in the range of about 400°–900° F.

References Cited

UNITED STATES PATENTS

| | | | |
|---|---|---|---|
| 2,927,782 | 3/1960 | Paton et al. | 18—6 |
| 2,997,739 | 8/1961 | Smith et al. | 18—6 |
| 3,315,314 | 4/1967 | Barnett et al. | 18—26 |

WILLIAM J. STEPHENSON, *Primary Examiner.*

ROBERT A. O'LEARY, *Examiner.*

T. W. STREULE, *Assistant Examiner.*